(12) United States Patent
Chen et al.

(10) Patent No.: US 12,382,534 B2
(45) Date of Patent: Aug. 5, 2025

(54) USER EQUIPMENT AND METHOD FOR MULTI-SIM OPERATION

(71) Applicant: SHARP KABUSHIKI KAISHA, Osaka (JP)

(72) Inventors: Hung-Chen Chen, Taipei (TW); Mei-Ju Shih, Taipei (TW); Yung-Lan Tseng, Taipei (TW)

(73) Assignee: SHARP KABUSHIKI KAISHA, Osaka (JP)

( * ) Notice: Subject to any disclaimer, the term of this patent is extended or adjusted under 35 U.S.C. 154(b) by 273 days.

(21) Appl. No.: 17/791,388

(22) PCT Filed: Jan. 21, 2021

(86) PCT No.: PCT/CN2021/073119
§ 371 (c)(1),
(2) Date: Jul. 7, 2022

(87) PCT Pub. No.: WO2021/147958
PCT Pub. Date: Jul. 29, 2021

(65) Prior Publication Data
US 2023/0047213 A1     Feb. 16, 2023

Related U.S. Application Data

(60) Provisional application No. 62/963,720, filed on Jan. 21, 2020.

(51) Int. Cl.
*H04W 8/18* (2009.01)
*H04W 8/22* (2009.01)
(Continued)

(52) U.S. Cl.
CPC ............ *H04W 76/27* (2018.02); *H04W 8/18* (2013.01); *H04W 8/22* (2013.01); *H04W 36/14* (2013.01);
(Continued)

(58) Field of Classification Search
CPC ..... H04W 8/18–245; H04W 28/02–26; H04W 36/0005–385; H04W 48/02–20;
(Continued)

(56) References Cited

U.S. PATENT DOCUMENTS

2013/0150126 A1  6/2013  Pattaswamy et al.
2015/0312787 A1  10/2015 Das et al.
(Continued)

FOREIGN PATENT DOCUMENTS

CN  103460756 A  12/2013
CN  106256142 A  12/2016
(Continued)

OTHER PUBLICATIONS

MediaTek Inc., "FS_MUSIM: NAS-triggered graceful RRC release", 3GPP TSG SA WG2 #136AH S2-2001672, Jan. 17, 2020.
(Continued)

*Primary Examiner* — Timothy J Weidner
(74) *Attorney, Agent, or Firm* — ScienBiziP, P.C.

(57) ABSTRACT

A user equipment and a method for performing a multi-Subscriber Identity Module (multi-SIM) operation are provided. The method includes connecting to a first network associated with a first Universal Subscriber Identity Module (USIM) of the UE; receiving, from the first network, a first configuration indicating that the UE is allowed to transmit an assistance information message for switching to a second network associated with a second USIM of the UE, the first configuration further including a configuration of a timer; transmitting, to the first network, the assistance information message, the assistance information message including information of a preferred Radio Resource Control (RRC) state associated with the first network to indicate that the UE prefers to switch from an RRC_CONNECTED state associated with the first network to the preferred RRC state; and
(Continued)

starting the timer upon transmitting the assistance information message.

20 Claims, 4 Drawing Sheets

(51) Int. Cl.
| | |
|---|---|
| *H04W 36/14* | (2009.01) |
| *H04W 36/22* | (2009.01) |
| *H04W 60/00* | (2009.01) |
| *H04W 60/06* | (2009.01) |
| *H04W 68/02* | (2009.01) |
| *H04W 68/12* | (2009.01) |
| *H04W 74/00* | (2009.01) |
| *H04W 74/02* | (2009.01) |
| *H04W 76/10* | (2018.01) |
| *H04W 76/25* | (2018.01) |
| *H04W 76/27* | (2018.01) |
| *H04W 76/30* | (2018.01) |
| *H04W 84/02* | (2009.01) |
| *H04W 88/06* | (2009.01) |
| *H04W 88/10* | (2009.01) |
| *H04W 92/02* | (2009.01) |
| *H04W 92/10* | (2009.01) |

(52) U.S. Cl.
CPC ......... *H04W 36/22* (2013.01); *H04W 60/005* (2013.01); *H04W 60/06* (2013.01); *H04W 68/02* (2013.01); *H04W 68/12* (2013.01); *H04W 74/002* (2013.01); *H04W 74/02* (2013.01); *H04W 76/10* (2018.02); *H04W 76/25* (2018.02); *H04W 76/30* (2018.02); *H04W 84/02* (2013.01); *H04W 88/06* (2013.01); *H04W 88/10* (2013.01); *H04W 92/02* (2013.01); *H04W 92/10* (2013.01)

(58) Field of Classification Search
CPC . H04W 60/005–06; H04W 68/005–12; H04W 74/002–0891; H04W 76/10–50; H04W 84/02–16; H04W 88/02–12; H04W 92/02–04; H04W 92/10; Y02D 30/70
See application file for complete search history.

(56) References Cited

U.S. PATENT DOCUMENTS

| | | | |
|---|---|---|---|
| 2016/0142087 | A1 | 5/2016 | Inampudi et al. |
| 2016/0249408 | A1 | 8/2016 | Thiruvenkatachari et al. |
| 2016/0353449 | A1 | 12/2016 | Chuttani et al. |
| 2017/0094501 | A1 | 3/2017 | Huang-Fu |
| 2017/0094628 | A1 | 3/2017 | Miao et al. |
| 2018/0160422 | A1 | 6/2018 | Pathak et al. |
| 2022/0210713 | A1 | 6/2022 | Hong |

FOREIGN PATENT DOCUMENTS

| | | |
|---|---|---|
| CN | 106464611 A | 2/2017 |
| CN | 107211482 A | 9/2017 |
| CN | 107926077 A | 4/2018 |
| CN | 108235267 A | 6/2018 |
| CN | 109155968 A | 1/2019 |
| CN | 110337825 A | 10/2019 |
| CN | 110366855 A | 10/2019 |
| JP | 2018501692 A | 1/2018 |
| KR | 20130066543 A | 6/2013 |
| WO | 2012140023 A1 | 10/2012 |

OTHER PUBLICATIONS

Rapporteur (MediaTek Incorporated), "Running CR for Power Savings", 3GPP TSG RAN WG2 #108 R2-1915548, Nov. 12, 2019.
Ericsson, "Offline #506 Release assistance", 3GPP TSG RAN WG2 #107bis R2-1914058, Oct. 18, 2019.
Samsung, "Remaining Issues on Efficient Transition", 3GPP TSG RAN WG2 #107bis R2-1912493, Oct. 4, 2019.
CATT, "Remaining issues on UE RRC state transition request", 3GPP TSG RAN WG2 #107bis R2-1912110, Oct. 3, 2019.
3GPP TR 22.834, "3rd Generation Partnership Project; Technical Specification Group Services and System Aspects; Study on Support for Multi-USIM Devices (Release 17)", V17.2.0 (Dec. 2019).
3GPP TS 38.300, "3rd Generation Partnership Project; Technical Specification Group Radio Access Network; NR; NR and NG-RAN Overall Description; Stage 2 (Release 15)", V15.8.0 (Dec. 2019).
3GPP TS 38.331, "3rd Generation Partnership Project; Technical Specification Group Radio Access Network; NR; Radio Resource Control (RRC) protocol specification (Release 15)", V15.8.0 (Dec. 2019).
One 2 One Personal Communications Limited, "Universal Subscriber Identity Module (USIM): An application residing on the UICC used for accessing services provided by mobile networks, which the application is able to register on with the appropriate security", S1-020363, TSG-SA WG 1 (Services) meeting #15, Saalfelden, Austria, Feb. 11-15, 2002 (Feb. 21, 2002).
Wang Mai et al., "Paging message and its monitoring algorithm under LTE network", Modern Science & Technology of Telecommunications, Oct. 15, 2009.
ZTE Corporation et al: "Remaining issues in efficient state transition by UE assistance", R2-1915086, 3GPP TSG-RAN WG2 Meeting#108, Reno, USA, Nov. 18-22, 2019 (Nov. 7, 2019).
ZTE: "Discussion on the way forward to the key issue#2", S2-2000935, SA WG2 Meeting #S2-136AH, Jan. 13-17, 2020, Incheon, South Korea (Jan. 7, 2020).
Qualcomm Incorporated: "Solution for scheduling gap", S2-2000117, SA WG2 Meeting #136AH, Jan. 13-17, 2020, Incheon, Korea (Jan. 7, 2020).
Apple Inc: "Methods for Multi-SIM Network Switching", R2-2009506, 3GPP TSG-RAN WG2 Meeting #112e, Electronic, Nov. 2, 2020-Nov. 13, 2020 (Oct. 23, 2020).
3rd Generation Partnership Project; Technical Specification Group Radio Access Network; NR; NR and NG-RAN Overall Description; Stage 2(Release 16), 3GPP TS 38.300 V16.0.0 (Dec. 2019).

USER EQUIPMENT AND METHOD FOR MULTI-SIM OPERATION

CROSS-REFERENCE TO RELATED APPLICATION(S)

The present disclosure is a National Stage application, filed under 35 U.S.C. § 371, of International Patent Application No. PCT/CN2021/073119, filed on Jan. 21, 2021, which claims the benefit of and priority to U.S. Provisional Patent Application Ser. No. 62/963,720, filed on Jan. 21, 2020. The contents of all above-named applications are hereby fully incorporated herein by reference for all purposes.

FIELD

The present disclosure is related to wireless communication and, more specifically, to multi-subscriber identity module (multi-SIM) operation in cellular wireless communication networks.

BACKGROUND

Abbreviations used in this disclosure include:

| Abbreviation | Full name |
| --- | --- |
| 3GPP | 3$^{rd}$ Generation Partnership Project |
| 5G | 5$^{th}$ Generation |
| 5GC | 5G Core Network |
| AS | Access Stratum |
| BS | Base Station |
| CA | Carrier Aggregation |
| CMAS | Commercial Mobile Alert System |
| DC | Dual Connectivity |
| DCI | Downlink Control Information |
| DL | Downlink |
| DRX | Discontinuous Reception |
| DSDA | Dual SIM Dual Active |
| DSDS | Dual SIM Dual Standby |
| E-UTRA | Evolved Universal Terrestrial Radio Access |
| eMBB | enhanced Mobile Broadband |
| EN-DC | E-UTRA NR Dual Connectivity |
| EPC | Evolved Packet Core |
| ETWS | Earthquake and Tsunami Warning System |
| ID | Identifier |
| IE | Information Element |
| LTE | Long Term Evolution |
| MAC | Medium Access Control |
| MAC CE | MAC Control Element |
| MCG | Master Cell Group |
| MIMO | Multi-Input Multi-Output |
| mMTC | massive Machine-Type Communication |
| MN | Master Node |
| MR-DC | Multi-RAT Dual Connectivity |
| MSG | Message |
| MSGA | Message A |
| MSGB | Message B |
| NAS | Non-Access Stratum |
| NE-DC | NR E-UTRA-Dual Connectivity |
| NGEN-DC | Next Generation E-UTRA NR-Dual Connectivity |
| NPN | Non-Public Network |
| NR | New Radio |
| NR-DC | NR NR-Dual Connectivity |
| NW | Network |
| PCell | Primary Cell |
| PDCCH | Physical Downlink Control Channel |
| PDSCH | Physical Downlink Shared Channel |
| PF | Paging Frame |
| PHY | Physical (layer) |
| PLMN | Public Land Mobile Network |
| PNI-NPN | Public Network Integrated Non-Public Network |
| PO | Paging Occasion |
| PRACH | Physical Random Access Channel |
| PUCCH | Physical Uplink Control Channel |
| PUSCH | Physical Uplink Shared Channel |
| RA | Random Access |
| RAN | Radio Access Network |
| RAT | Radio Access Technology |
| RF | Radio Frequency |
| RRC | Radio Resource Control |
| RX | Reception |
| SCell | Secondary Cell |
| SCG | Secondary Cell Group |
| SIM | Subscriber Identity Module |
| SN | Secondary Node |
| SNPN | Single Non-Public Network |
| TA | Timing Advance |
| TDM | Time Division Multiplexing |
| TR | Technical Report |
| TS | Technical Specification |
| TX | Transmission |
| UE | User Equipment |
| UL | Uplink |
| URLLC | Ultra-Reliable and Low-Latency Communication |
| USIM | Universal Subscriber Identity Module |
| V2X | Vehicle-to-Everything |

Various efforts have been made to improve different aspects of wireless communication for cellular wireless communication systems, such as 5G NR, by improving data rate, latency, reliability, and mobility. The 5G NR system is designed to provide flexibility and configurability to optimize the network services and types, accommodating various use cases such as eMBB, mMTC, and URLLC. However, as the demand for radio access continues to increase, there exists a need for further improvements in the art.

SUMMARY

The present disclosure is related to multi-SIM operation in cellular wireless communication networks.

In a first aspect of the present disclosure, a method for a multi-SIM operation performed by a UE is provided. The method includes connecting to a first network associated with a first USIM of the UE; receiving, from the first network, a first configuration indicating that the UE is allowed to transmit an assistance information message for switching to a second network associated with a second USIM of the UE, the first configuration further including a configuration of a timer; transmitting, to the first network, the assistance information message, the assistance information message comprising information of a preferred RRC state associated with the first network to indicate that the UE prefers to switch from an RRC_CONNECTED state associated with the first network to the preferred RRC state; and starting the timer upon transmitting the assistance information message.

In an implementation of the first aspect, the first configuration, as received, is set to a setup configuration which indicates that the UE is allowed to transmit the assistance information message.

In another implementation of the first aspect, transmitting the assistance information message comprises transmitting the assistance information message upon determining that the timer is not running.

In another implementation of the first aspect, the method further includes stopping the timer upon determining that the first configuration is set to release.

In another implementation of the first aspect, the method further includes stopping the timer upon transitioning to an RRC_IDLE state associated with the first network.

In another implementation of the first aspect, the preferred RRC state is an RRC_INACTIVE state.

In another implementation of the first aspect, the preferred RRC state is an RRC_IDLE state.

In another implementation of the first aspect, transmitting the assistance information message to the first network comprises transmitting the assistance information message after determining that the UE is capable of providing assistance information related to the multi-SIM operation.

In another implementation of the first aspect, the method further includes transmitting, to the first network, capability information indicating that the UE supports the multi-SIM operation.

In another implementation of the first aspect, the method further includes receiving, from the first network, a second configuration indicating a measurement gap used for the second network.

In a second aspect of the present disclosure, a UE for a multi-SIM operation is provided. The UE includes one or more processors and at least one memory coupled to the one or more processors. The at least one memory stores a computer-executable program that, when executed by the one or more processors, causes the UE to: connect to a first network associated with a first USIM of the UE; receive, from the first network, a first configuration indicating that the UE is allowed to transmit an assistance information message for switching to a second network associated with a second USIM of the UE, the first configuration further including a configuration of a timer; transmit, to the first network, the assistance information message, the assistance information message comprising information of a preferred RRC state associated with the first network to indicate that the UE prefers to switch from an RRC_CONNECTED state associated with the first network to the preferred RRC state; and start the timer upon transmitting the assistance information message.

BRIEF DESCRIPTION OF THE DRAWINGS

Aspects of the disclosure are best understood from the following detailed disclosure when read with the accompanying drawings. Various features are not drawn to scale. Dimensions of various features may be arbitrarily increased or reduced for clarity of discussion.

DESCRIPTION

Figure 1:
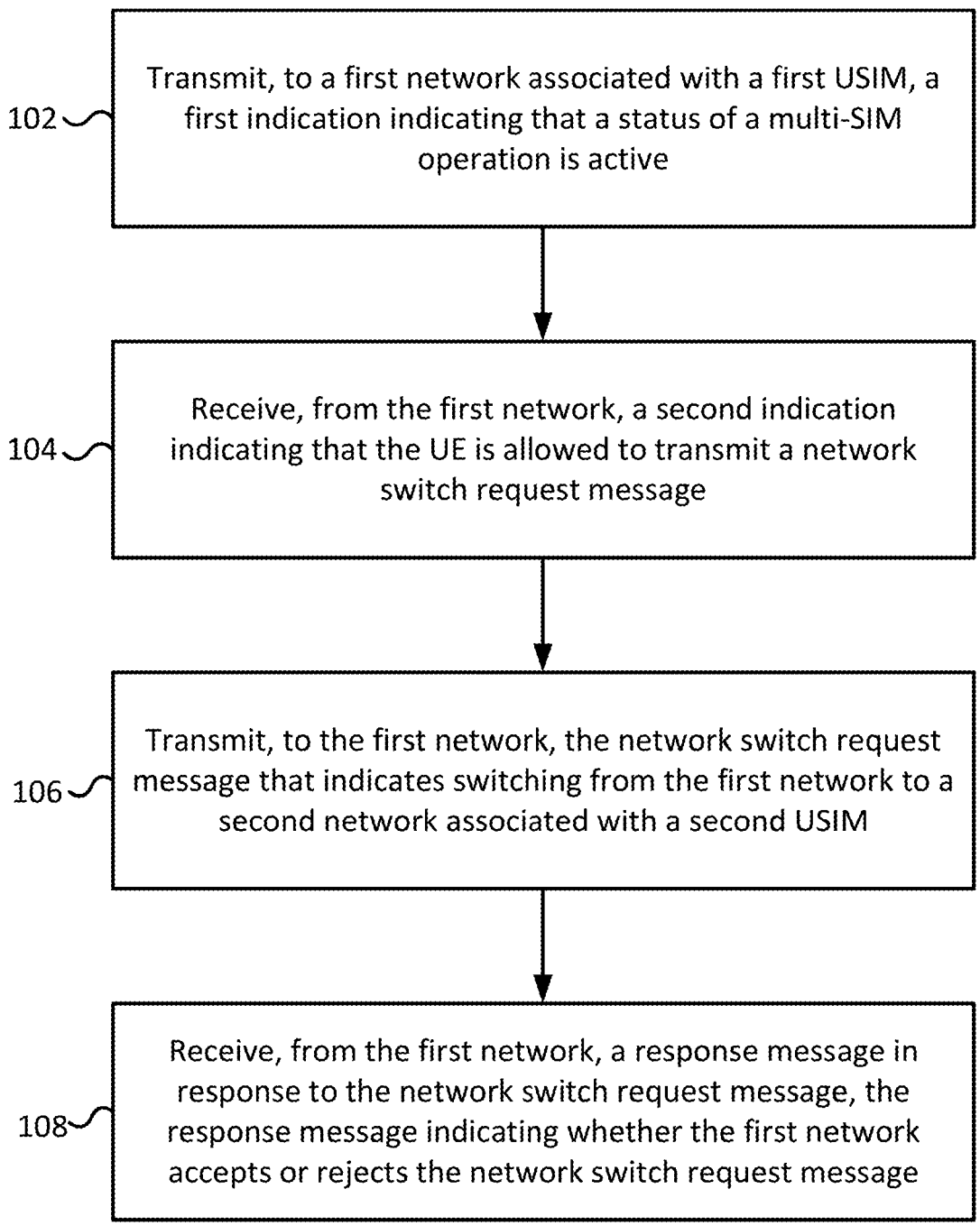
FIG. 1 is a flowchart illustrating a method performed by a UE for the multi-SIM operation according to an example implementation of the present disclosure.

The following contains specific information related to implementations of the present disclosure. The drawings and their accompanying detailed disclosure are merely directed to implementations. However, the present disclosure is not limited to these implementations. Other variations and implementations of the present disclosure will be obvious to those skilled in the art.

Unless noted otherwise, like or corresponding elements among the drawings may be indicated by like or corresponding reference numerals. Moreover, the drawings and illustrations in the present disclosure are generally not to scale and are not intended to correspond to actual relative dimensions.

For the purpose of consistency and ease of understanding, like features may be identified (although, in some examples, not illustrated) by the same numerals in the drawings. However, the features in different implementations may be different in other respects and shall not be narrowly confined to what is illustrated in the drawings.

The phrases "in one implementation," or "in some implementations," may each refer to one or more of the same or different implementations. The term "coupled" is defined as connected whether directly or indirectly via intervening components and is not necessarily limited to physical connections. The term "comprising" means "including, but not necessarily limited to" and specifically indicates open-ended inclusion or membership in the so-disclosed combination, group, series or equivalent. The expression "at least one of A, B and C" or "at least one of the following: A, B and C" means "only A, or only B, or only C, or any combination of A, B and C."

The terms "system" and "network" may be used interchangeably. The term "and/or" is only an association relationship for describing associated objects and represents that three relationships may exist such that A and/or B may indicate that A exists alone, A and B exist at the same time, or B exists alone. The character "/" generally represents that the associated objects are in an "or" relationship.

For the purposes of explanation and non-limitation, specific details such as functional entities, techniques, protocols, and standards are set forth for providing an understanding of the disclosed technology. In other examples, detailed disclosure of well-known methods, technologies, systems, and architectures are omitted so as not to obscure the present disclosure with unnecessary details.

Persons skilled in the art will immediately recognize that any network function(s) or algorithm(s) disclosed may be implemented by hardware, software, or a combination of software and hardware. Disclosed functions may correspond to modules which may be software, hardware, firmware, or any combination thereof.

A software implementation may include computer executable instructions stored on a computer readable medium such as memory or other type of storage devices. One or more microprocessors or general-purpose computers with communication processing capability may be programmed with corresponding executable instructions and perform the disclosed network function(s) or algorithm(s).

The microprocessors or general-purpose computers may include Application-Specific Integrated Circuits (ASICs), programmable logic arrays, and/or one or more Digital Signal Processor (DSPs). Although some of the disclosed implementations are oriented to software installed and executing on computer hardware, alternative implementations implemented as firmware or as hardware or as a combination of hardware and software are well within the scope of the present disclosure. The computer readable medium includes but is not limited to Random Access Memory (RAM), Read Only Memory (ROM), Erasable Programmable Read-Only Memory (EPROM), Electrically Erasable Programmable Read-Only Memory (EEPROM), flash memory, Compact Disc Read-Only Memory (CD-ROM), magnetic cassettes, magnetic tape, magnetic disk storage, or any other equivalent medium capable of storing computer-readable instructions.

A radio communication network architecture such as a Long-Term Evolution (LTE) system, an LTE-Advanced (LTE-A) system, an LTE-Advanced Pro system, or a 5G NR Radio Access Network (RAN) typically includes at least one base station (BS), at least one UE, and one or more optional network elements that provide connection within a network. The UE communicates with the network such as a Core Network (CN), an Evolved Packet Core (EPC) network, an Evolved Universal Terrestrial RAN (E-UTRAN), a 5G Core (5GC), or an internet via a RAN established by one or more BSs.

A UE may include but is not limited to a mobile station, a mobile terminal or device, or a user communication radio terminal. The UE may be a portable radio equipment that includes but is not limited to a mobile phone, a tablet, a wearable device, a sensor, a vehicle, or a Personal Digital Assistant (PDA) with wireless communication capability. The UE is configured to receive and transmit signals over an air interface to one or more cells in a RAN.

The BS may be configured to provide communication services according to at least a Radio Access Technology (RAT) such as Worldwide Interoperability for Microwave Access (WiMAX), Global System for Mobile communications (GSM) that is often referred to as 2G, GSM Enhanced Data rates for GSM Evolution (EDGE) RAN (GERAN), General Packet Radio Service (GPRS), Universal Mobile Telecommunication System (UMTS) that is often referred to as 3G based on basic wideband-code division multiple access (W-CDMA), high-speed packet access (HSPA), LTE, LTE-A, evolved LTE (eLTE) that is LTE connected to 5GC, NR (often referred to as 5G), and/or LTE-A Pro. However, the scope of the present disclosure is not limited to these protocols.

The BS may include but is not limited to a node B (NB) in the UMTS, an evolved node B (eNB) in LTE or LTE-A, a radio network controller (RNC) in UMTS, a BS controller (BSC) in the GSM/GERAN, an ng-eNB in an Evolved Universal Terrestrial Radio Access (E-UTRA) BS in connection with 5GC, a next generation Node B (gNB) in the 5G-RAN, or any other apparatus capable of controlling radio communication and managing radio resources within a cell. The BS may serve one or more UEs via a radio interface.

The BS is operable to provide radio coverage to a specific geographical area using a plurality of cells forming the RAN. The BS supports the operations of the cells. Each cell is operable to provide services to at least one UE within its radio coverage.

Each cell (often referred to as a serving cell) provides services to serve one or more UEs within its radio coverage such that each cell schedules the DL and optionally UL resources to at least one UE within its radio coverage for DL and optionally UL packet transmissions. The BS can communicate with one or more UEs in the radio communication system via the plurality of cells.

A cell may allocate sidelink (SL) resources for supporting Proximity Service (ProSe) or Vehicle to Everything (V2X) service. Each cell may have overlapped coverage areas with other cells.

In Multi-RAT Dual Connectivity (MR-DC) cases, the primary cell of a Master Cell Group (MCG) or a Secondary Cell Group (SCG) may be called a Special Cell (SpCell). A Primary Cell (PCell) may refer to the SpCell of an MCG. A Primary SCG Cell (PSCell) may refer to the SpCell of an SCG. MCG may refer to a group of serving cells associated with the Master Node (MN), comprising of the SpCell and optionally one or more Secondary Cells (SCells). An SCG may refer to a group of serving cells associated with the Secondary Node (SN), comprising of the SpCell and optionally one or more SCells.

As previously disclosed, the frame structure for NR supports flexible configurations for accommodating various next generation (e.g., 5G) communication requirements such as Enhanced Mobile Broadband (eMBB), Massive Machine Type Communication (mMTC), and Ultra-Reliable and Low-Latency Communication (URLLC), while fulfilling high reliability, high data rate and low latency requirements. The Orthogonal Frequency-Division Multiplexing (OFDM) technology in the 3GPP may serve as a baseline for an NR waveform. The scalable OFDM numerology such as adaptive sub-carrier spacing, channel bandwidth, and Cyclic Prefix (CP) may also be used.

Two coding schemes are considered for NR, specifically Low-Density Parity-Check (LDPC) code and Polar Code. The coding scheme adaption may be configured based on channel conditions and/or service applications.

At least DL transmission data, a guard period, and UL transmission data should be included in a transmission time interval (TTI) of a single NR frame. The respective portions of the DL transmission data, the guard period, and the UL transmission data should also be configurable based on, for example, the network dynamics of NR. SL resources may also be provided in an NR frame to support ProSe services or V2X services.

Multi-USIM devices have been more and more popular in different areas and countries. For example, a user may have both a personal subscription and a business subscription in one device or have two personal subscriptions in one device for different services (e.g., one individual subscription and one "family circle" plan subscription). However, support for multi-USIM within a device is currently handled in an implementation-specific manner without any support from 3GPP specifications, resulting in a variety of implementations and UE behaviors. Such a situation may cause increasing complexity for UE vendors, unexpected UE behavior for network vendors or operators, and degraded user experience. It would be beneficial to provide standardizing support for a multi-USIM (or multi-SIM) UE from a performance perspective in that network functionality can be based on predictable UE behavior.

For a multi-USIM (or multi-SIM) UE, it may happen that the UE is actively communicating with a first network (referred to as "Network A" in the present disclosure) while a second network (referred to as "Network B" in the present disclosure) pages the UE. Therefore, a mechanism for the UE to notify Network A of its leaving (e.g., switching from Network A to Network B) may be needed. Methods for the multi-SIM UE to notify the connecting network of its switching from the connecting network are disclosed in the present disclosure.

Multi-SIM Operation

A Multi-SIM device may operate either in Dual SIM Dual Standby (DSDS) or Dual SIM Dual Active (DSDA) mode, but is not limited to these modes. DSDS and DSDA are specified in TR 22.834.

DSDS: both SIMS (including a first SIM and a second SIM) may be used for idle-mode network connection, but when a radio connection is active, the other connection is disabled. The SIMs in a DSDS device may share a single transceiver. Two radio connections may be maintained in idle mode through time multiplexing. When the UE is in-call on the network for the first SIM, it is no longer possible to maintain a radio connection to the network of the second SIM. Therefore, the connection to the network of the second SIM is unavailable for the duration of the call. Registration to the network of the second SIM may be maintained.

DSDA: both SIMS may be used in both the idle mode and the connected mode. Each SIM has a dedicated transceiver, meaning that there are no interdependencies on idle mode or connected mode operation at the modem level.

Based on the device implementation choices, several architectures for multi-SIM devices may coexist in the market to support DSDS or DSDA. The architectures for the multi-SIM devices may include {single RX, single TX}, {dual RX, single TX} and {dual RX, dual TX}. RX may mean a reception antenna, a reception antenna panel, a reception antenna chain, or a reception antenna system. TX may mean a transmission antenna, a transmission antenna panel, a transmission antenna chain, or a transmission antenna system. Single RX may mean a single reception RF antenna (panel/chain/system), single TX may mean a single transmission RF antenna (panel/chain/system), dual RX may mean two reception RF antennas (panels/chains/systems) used for two networks respectively, and dual TX may mean two transmission RF antennas (panels/chains/systems) used for two networks respectively. A single RX UE may not be capable of receiving traffic from two networks at the same time, while a dual RX UE may be able to receive traffic from two networks at the same time. A single TX UE may not be capable of transmitting traffic to two networks at the same time, while a dual TX UE may be able to transmit traffic to two networks at the same time.

In multi-SIM scenarios, a UE may be (pre)configured or installed with at least two USIM(s). A USIM may be a physical SIM or eSIM. In one implementation, the UE may be equipped with a first SIM card and a second SIM card. The UE operating in a multi-SIM mode (or a dual-SIM mode) may also be referred to as a multi-SIM UE (or a dual-SIM UE).

The USIMs of the UE may belong to the same operator or different operators. An operator may be a public network operator (e.g., PLMN operator), or a non-public network (e.g., SNPN operator, PNI-NPN operator). The network of one USIM (e.g., associated with Network A) may include NR, LTE connected to 5GC, LTE connected to EPC, multi-connectivity (e.g., EN-DC, NE-DC, NGEN-DC, NR-DC), but is not limited thereto. For example, a UE with two USIMs may operate on Network A (e.g., NR or LTE) and Network B (e.g., NR or LTE). The core network of Network A may be the same as the core network of Network B. The core network of Network A may be different from the core network of Network B. For example, considering LTE connected to EPC, Network A may refer to LTE and the core network of Network A may refer to EPC. For another example, considering NR, Network A may refer to NR and the core network of Network A may refer to 5GC. The UE may be equipped with {single RX, single TX}, {dual RX, single TX}, or {dual RX, dual TX}.

Network Switch Request

In some implementations, a multi-SIM UE may inform a network (or the corresponding base station) about its capability of supporting the multi-SIM operation. In some implementations, a multi-SIM UE may inform a network (or the corresponding base station) about its capability of supporting the multi-SIM operation via a network request. In some implementations, a multi-SIM UE may inform a network (or the corresponding base station) about its architecture (or type of RF chain) for supporting the multi-SIM operation. In some implementations, a multi-SIM UE may inform a network (or the corresponding base station) about its architecture for supporting the multi-SIM operation via a network request. For example, the UE may report its architecture for supporting the multi-SIM operation as {single TX, single RX}. For example, the UE may report its architecture for supporting the multi-SIM operation as {single TX, dual RX}. For example, the UE may report its architecture for supporting the multi-SIM operation as {dual TX, dual RX}.

In one implementation, if the UE receives a first RRC message (e.g., UE Capability Enquiry message) including information related to "Multi-SIM request" from a network, the UE may transmit a second RRC message (e.g., UE Capability Information message) to the network in response. The second RRC message (e.g., UE Capability Information message) may indicate whether the UE supports the multi-SIM operation. The RRC entity of the UE may submit the second RRC message to lower layers for transmission to the network.

In one implementation, if the UE receives a first RRC message (e.g., UE Capability Enquiry message) including information related to "RF chain request" from a network, the UE may transmit a second RRC message (e.g., UE Capability Information message) to the network in response. The second RRC message (e.g., UE Capability Information message) may include information about which RF chains the UE supports (e.g., {single RX, single TX}, {dual RX, single TX}, or {dual RX, dual TX}). The RRC entity of the UE may submit the second RRC message to lower layers for transmission to the network.

In one implementation, if the UE receives a first RRC message (e.g., UE Capability Enquiry message) including the information related to "Network B RAT type" (by assuming the UE is in Network A or connects to Network A) from a network, the UE may transmit a second RRC message (e.g., UE Capability Information message) to the network in response. The second RRC message (e.g., UE Capability Information message) may include information about which Network B RAT the UE supports or registers to (e.g., NR, LTE). The RRC entity of the UE may submit the second RRC message to lower layers for transmission to the network.

In some implementations, a multi-SIM UE may inform a network (or the corresponding base station) about its mode (e.g., DSDS or DSDA) for supporting the multi-SIM operation. In some implementations, a multi-SIM UE may inform a network (or the corresponding base station) about its mode (e.g., DSDS or DSDA) for supporting the multi-SIM operation via a network request.

For example, the UE may report its architecture for supporting the multi-SIM operation as the DSDS mode. In some implementations, for a UE with the DSDS mode, the UE may be configured to be allowed to send a network switch request. It should be noted that a "network switch request" may also be referred to as a "network switch request message", a "network switching notification" or a "network switching notification message" in the present disclosure. In some implementations, for a UE with the DSDS mode, the UE may need to send a network switch request to the first network before switching to the second network. In some implementations, for a UE with the DSDS mode, the UE may need to send a network switch request and receive a network feedback/response before switching to another network.

For example, the UE may report its architecture for supporting the multi-SIM operation as the DSDA mode. In some implementations, for a UE with the DSDA mode, the UE may not be configured to be allowed to send a network switch request. In some implementations, for a UE with the DSDA mode, the UE may not need to send a network switch request before switching to another network. In some implementations, for a UE with the DSDA mode, the UE may switch to another network (e.g., Network B) without any network feedback/response from the current connecting network (e.g., Network A).

In some implementations, a multi-SIM UE may inform a network (or the corresponding base station) about its status of the multi-SIM operation. For example, the multi-SIM UE may inform the network that its status of the multi-SIM operation is on (active). That is, the UE may be (pre) configured or installed with at least two USIM(s) now. When one installed USIM of the UE is removed (or disabled), the UE may inform the network that its status of the multi-SIM operation is off (inactive). In some implementations, if the current status of the multi-SIM operation is different from the previous status of the multi-SIM operation reported to the network, the multi-SIM UE may inform the network its multi-SIM operation status is changed. For example, the UE may inform the network that its multi-SIM operation status is on (active) first. However, after one installed USIM of the UE is removed (or disabled), the UE may need to inform the network that its multi-SIM operation status is off (inactive) now.

In some implementations, a multi-SIM UE may inform a network (or the corresponding base station) about its status of the multi-SIM operation via a network request. In some implementations, the multi-SIM UE may inform the network (or the corresponding base station) of its (current) status of the multi-SIM operation via MSG3 in a 4-step RA procedure (or via MSGA in a 2-step RA procedure). For example, a base station (e.g., a gNB) may broadcast an indication in system information to indicate to a multi-SIM UE to report its status of the multi-SIM operation via MSG3 in a 4-step RA procedure. For example, a base station (e.g., a gNB) may broadcast an indication in system information to indicate to a multi-SIM UE to report its status of the multi-SIM operation via MSGA in a 2-step RA procedure. By reporting the UE's status of the multi-SIM operation via MSG3 or MSGA, the network can receive information related to the multi-SIM operation before the RA procedure is completed and thus can complete the corresponding configuration earlier. For example, Network A can indicate to the UE scheduling gap information related to Network B (e.g., a measurement gap, a period to perform UL transmissions to Network B, a period to monitor paging from Network B, an adjusted paging occasion, a timing offset to the paging occasion) during the first RRC reconfiguration process after the RA procedure is completed.

In some implantations, a base station (e.g., a gNB) may broadcast information indicating that the base station supports the multi-SIM operation. In some implementations, a multi-SIM UE may report its status of the multi-SIM operation via MSG3 only when the status is "on". In some implementations, a multi-SIM UE may report its status of the multi-SIM operation via MSGA only when the status is "on". In some implementations, a multi-SIM UE may report its status of the multi-SIM operation via MSG3 when the status is "on" or "off". In some implementations, a multi-SIM UE may report its status of the multi-SIM operation via MSGA when the status is "on" or "off". The MSG3 may carry an RRC Connection Request message, an RRC Resume Request message, or an RRC Reestablishment Request message, but is not limited thereto.

In some implementations, a multi-SIM UE may inform a network (or the corresponding base station) about its (current) status of the multi-SIM operation via MSG5. For example, a base station (e.g., a gNB) may broadcast an indication in system information to indicate (at least) to a multi-SIM UE to report its status of the multi-SIM operation via MSG5. For example, a base station (e.g., a gNB) may provide an indication via MSG4 to indicate to a multi-SIM UE to report its status of the multi-SIM operation via MSG5. For example, a base station (e.g., a gNB) may provide an indication via MSGB to indicate to a multi-SIM UE to report its status of the multi-SIM operation. In some implementations, a multi-SIM UE may report its status of the multi-SIM operation via MSG5 only when the status is "on". In some implementations, a multi-SIM UE may report its status of the multi-SIM operation via MSG5 when the status is "on" or "off".

The MSG4 may carry an RRC Setup message, an RRC Resume message, or an RRC Reestablishment message, but is not limited thereto. The MSG5 may carry an RRC Setup Complete message, an RRC Resume Complete message, or an RRC Reestablishment Complete message, but is not limited thereto. The MSGA may include preamble and payload transmissions of a 2-step RA procedure. The MSGB may be a response to the MSGA in the 2-step RA procedure. The MSGB may include response(s) for contention resolution, fallback indication(s), and backoff indication (e.g., as specified in TS 38.300).

In some implementations, a multi-SIM UE may inform a network (or the corresponding base station) related paging configuration(s), related paging parameters, or other paging related information (e.g., a required measurement gap, a required scheduling gap, or gap pattern(s)) associated with another network (e.g., via an RRC message or a network switch request message). For example, if a multi-SIM UE with two USIMs operates on Network A (e.g., NR or LTE) and Network B (e.g., NR or LTE), the UE may inform the related paging configuration(s), related paging parameters, or other paging related information (e.g., a required measurement gap, a required scheduling gap, or gap pattern(s)) associated with Network B to Network A (e.g., when the UE connects to Network A). In some implementations, a multi-SIM UE may inform a network (or the corresponding base station) related paging configuration(s), related paging parameters, or other paging related information (e.g., a required measurement gap, a required scheduling gap, or gap pattern(s)) associated with another network via a network switch request.

In some implementations, the current connecting network (e.g., Network A) may transmit to the UE timing information for monitoring paging or for other DL reception/UL transmission. In some implementations, the current connecting network (e.g., Network A) may indicate a period (e.g., a measurement gap, scheduling gap, or gap pattern) for the UE to receive paging. For example, the current connecting network may transmit to the UE information indicating the period used for reception of paging associated with another network (e.g., Network B) after receiving the related paging configuration(s), related paging parameters, or other paging related information associated with another network (e.g., Network B).

In some implementations, the current connecting network (e.g., Network A) may indicate new paging occasion(s) for the UE to receive paging. The new paging occasion(s) may be adjusted paging occasion(s) compared with previously calculated/configured paging occasion(s). For example, the current connecting network may transmit information indicating adjusted paging occasion(s) to the UE after receiving the related paging configuration(s), related paging parameters, or other paging related information associated with another network. For example, the UE may use the new indicated paging occasions(s) to receive paging from Network A and ignore the original paging occasion(s) that is calculated by the UE's ID by applying a formula to calculate the paging occasion(s).

In some implementations, the current connecting network (e.g., Network A) may indicate a timing offset for the UE to receive paging. For example, the current connecting network may transmit information indicating the timing offset to the UE after receiving the related paging configuration(s), related paging parameters, or other paging related information associated with another network. For example, the UE may receive paging from Network A on the new paging occasion(s) by shifting the original paging occasions(s) (which is calculated by the UE's ID by applying the formula to calculate the paging occasion(s)) with the indicated timing offset. In one implementation, the current connecting network (e.g., Network A) may transmit information indicating at least one of an adjusted paging occasion and a timing offset for the UE to monitor paging from the current connecting network.

In some implementations, a network (or the corresponding base station) may configure/indicate (e.g., via an indication) to a multi-SIM UE (e.g., based on the reported UE capability, the reported UE status of the multi-SIM operation, or the UE mode (e.g., DSDS or DSDA)) whether the UE is allowed to transmit a network switch request. In some implementations, a network may configure/indicate to a multi-SIM UE (e.g., based on the reported UE capability, the reported UE status of the multi-SIM operation, or the UE mode) whether the UE is allowed to transmit a network switch request, via (an indication in) dedicated signaling or broadcasting system information.

The indication indicating that the UE is allowed to transmit the network switch request may be explicit or implicit. For example, a multi-SIM UE may consider itself as being configured/allowed to transmit a network switch request (which is to inform the network of the UE's switching from the network) if permission is included in an RRC message (explicit indication), such as an RRC Reconfiguration message, but is not limited thereto. For example, the multi-SIM UE may consider itself as being configured/allowed to transmit the network switch request if the network broadcasts its support of the multi-SIM operation (implicit indication). For example, the multi-SIM UE may consider itself as being configured/allowed to transmit the network switch request if a configuration of network switch requests is set to setup. For example, the multi-SIM UE may consider itself as not being configured to transmit the network switch request if a configuration of network switch requests is set to release (or is not set to setup).

In some implementations, a network (or the corresponding base station) may indicate under which condition a UE is allowed to transmit a network switch request. For example, the network may indicate that a UE is only allowed to transmit the network switch request when a Multimedia Priority Service, a Mission Critical Service, ETWS/CMAS service, URLLC service, or a voice-related service is required on another network (e.g., Network B). For example, the network may indicate that a UE is only allowed to transmit the network switch request when a voice-related service is required on another network (e.g., Network B). For example, the UE may receive, from Network B, a paging message with a paging cause related to voice service(s). In one implementation, the UE may transmit to Network A the network switch request upon receiving a paging (e.g., a paging DCI, short message, or paging message) from Network B. In one implementation, the paging (e.g., the paging DCI, short message, or paging message) from Network B may be related to a voice service, such as an incoming phone call in Network B. For example, the UE may transmit to Network A the network switch request upon receiving a paging related to a voice service from Network B.

In some implementations, a configuration of network switch requests may include a prohibit timer T1 to prevent the UE from frequently transmitting a network switch request message. The prohibit timer T1 may be configured in a reconfiguration (e.g., otherConfig IE, network switch related IE, or ReleaseRequestConfig IE). The otherConfig IE may contain a configuration related to miscellaneous other configurations. The ReleaseRequestConfig IE may be a configuration for the UE to report assistance information to inform the gNB of the UE's preference to leave the RRC_CONNECTED state or to leave the RRC_INACTIVE state (e.g., if the UE is performing small data transmission in the RRC_INACTIVE state) and/or to inform the gNB of the network switch.

In some implementations, the UE may start (or restart) the prohibit timer T1 upon transmitting the network switch request, upon receiving a rejection message in response to the network switch request, upon receiving an acknowledgment/acceptance message in response to the network switch request, or upon the prohibit timer T1 being reconfigured. In some implementations, the UE may stop the prohibit timer T1 under at least one of the following conditions: when the UE initiates an RA procedure in another network (or corresponding base station); when the UE successfully connects to another network (or corresponding base station); when the UE successfully completes the RA procedure to another network (or corresponding base station); when the UE transmits the MSG5 to another network (or corresponding base station); when the UE transitions to the RRC_IDLE state or the RRC_INACTIVE state (related to the network with which the prohibit timer T1 is associated); when the associated configuration of network switch requests is set to release (or is not set to setup); when an RRC reestablishment procedure is initiated; when an RRC resume procedure is initiated; and when the prohibit timer T1 is reconfigured or released. In some implementations, the multi-SIM UE may be allowed to transmit another network switch request when the prohibit timer T1 expires.

In some implementations, a multi-SIM UE may be (implicitly) allowed to transmit a network switch request if the UE supports the multi-SIM operation and/or the status of the multi-SIM operation is on. In some implementations, a multi-SIM UE may be (implicitly) allowed to transmit a network switch request if the UE supports the DSDS mode. In some implementations, the network switch request may be used to inform a network of the UE's switching from the network. In some implementations, the network switch request may be included in a UE Assistance Information message or a new RRC message. In some implementations, the network switch request may be an indicator in Boolean format or ENUMERATED format.

In some implementations, a release request in an RRC message (e.g., a UE assistance information message or an RRC Release Request message) may serve different purposes. One purpose is for power saving by indicating a preferred RRC state (e.g., RRC_IDLE, RRC_INACTIVE, or RRC_CONNECTED) (e.g., in Network A), and another purpose is for the network switch request for the multi-SIM operation. The UE may transmit the release request if the UE requires power saving. The UE may transmit the release request if the UE needs to perform network switching for the multi-SIM operation. In one implementation, the network switch request may indicate a preferred RRC state of the UE. For example, the UE may indicate to Network A that the UE is about (or intends) to leave Network A when the preferred RRC state in the network switch request is RRC_INACTIVE or RRC_IDLE.

In some implementations, when a multi-SIM UE is connected to Network A (or the corresponding base station) but receives paging from Network B, the UE may transmit a network switch request to Network A to inform its switching from Network A. In some implementations, when a multi-SIM UE is connected to Network A (or the corresponding base station) but is required to start service(s) or UL transmissions in Network B, the UE may transmit a network switch request to Network A to inform Network A of the UE switching (e.g., a short-time switching or a long-time switching) from Network A. The short-time switching may mean that the UE switches to Network B for a short period (and possibly switches back to Network A afterward). The long-time switching may mean that the UE switches to Network B for a long period (and possibly stay in Network B afterward). If the multi-SIM UE is connected to Network A (or the corresponding base station), the UE may be in the RRC_CONNECTED state (in Network A) (e.g., for short-time switching to Network B). If the multi-SIM UE is not connected to Network A (or the corresponding base station), the UE may be in the RRC_INACTIVE state or the RRC_IDLE state (in Network A) (e.g., for long-time switching to Network B).

In some implementations, the purpose of transmitting UE assistance information (or initiating a UE assistance information procedure) is to inform a network of at least one of the following:

the UE's delay budget report carrying a desired increment/decrement in the connected mode DRX cycle length;
the UE's overheating assistance information;
the UE's preference on DRX parameters for power saving;
the UE's preference on the maximum aggregated bandwidth for power saving;
the UE's preference on the maximum number of secondary component carriers for power saving;
the UE's preference on the maximum number of MIMO layers for power saving;
the UE's preference on the minimum scheduling offset for cross-slot scheduling for power saving;
assistance information to transition out of the RRC_CONNECTED state when the UE does not expect to send or receive data in the near future (e.g., a fixed time duration predefined and/or (pre)configured by the network);
assistance information to switch to another network (e.g., for the UE in the multi-SIM operations);
another network's UE-specific PO and PF configurations (or other paging relation configuration) and/or cell-specific configuration (e.g., paging DRX cycle).

In some implementations, a UE capable of providing assistance information (or a network switch request) for network switching may initiate a UE assistance information procedure if the UE is configured to do so.

In some implementations, when a multi-SIM UE is connected to Network A (or the corresponding base station) but receives paging from Network B, the UE may transmit a UE assistance information message (or a network switch request message) to Network A to inform Network A of the UE switching from Network A. In some implementations, when a multi-SIM UE is connected to Network A (or the corresponding base station) but receives paging from Network B, the UE may transmit a UE assistance information message (or a network switch request message) to Network A to inform Network A of the UE switching from Network A if the received paging indicates a voice-related service (e.g., Voice over LTE or Voice over NR). In some implementations, when a multi-SIM UE is connected to Network A (or the corresponding base station) but receives paging from Network B, the UE may transmit a UE assistance information message (or a network switch request message) to Network A to inform Network A of the UE switching from Network A if the received paging indicates a service with a higher priority (e.g., Multimedia Priority Service or Mission Critical Service). In some implementations, when a multi-SIM UE is connected to Network A (or the corresponding base station) but receives paging from Network B, the UE may transmit a UE assistance information message (or a network switch request message) with a switch cause to Network A to inform Network A of the UE switching from Network A. The switch cause may be a voice-related service or a high priority service associated with another network, but is not limited thereto. For example, the UE may have an application starting and may need to switch to Network B. For example, the UE may receive paging from Network B and may know that there is an important service coming from Network B.

In some implementations, a network switch request may be included or set in a UE assistance information message. For example, if the UE needs to switch to another network for responding to paging, the UE may include or set a network switch request in the UE assistance information message. For example, if the network switch request is present or set to "true" in the UE assistance information message, the network may consider that the UE requests switching to another network.

In some implementations, a release request IE in a UE assistance information message may be set based on different purposes. Table 1 shows an example release request IE.

TABLE 1

| ReleaseRequest ::= | SEQUENCE { |
|---|---|
| preferredRRC-State | ENUMERATED {idle, inactive, connected} OPTIONAL |
| networkSwitch | ENUMERATED {true} OPTIONAL |
| } | |

The preferredRRC-State IE may indicate a UE's preferred RRC state upon switching out of the RRC_CONNECTED state. The preferredRRC-State IE may be "connected" if the UE prefers to remain in the RRC_CONNECTED state. If the preferredRRC-State IE is not included in the ReleaseRequest IE, the UE may prefer to leave the RRC_CONNECTED state. The networkSwitch IE may indicate whether the purpose of the preferredRRC-State IE is for power saving or for the network switch request for the multi-SIM operation. If the networkSwitch IE is set to "true", the UE may prefer to be in the RRC state indicated by the preferredRRC-State IE when transmitting the network switch request. If the networkSwitch IE is absent (or set to "false"), the UE may prefer to be in the RRC state indicated by the preferredRRC-State IE for power saving. In some implementations, the UE may indicate the RAT type of a target network associated with a network switch request, e.g., NR or LTE. For example, the UE may include the RAT type of a target network in the UE assistance information message (or the network switch request message).

Table 2 shows another example release request IE in the UE assistance information, where a network switch cause is included. The network switch cause (networkSwitchCause IE in Table 2) may indicate why the network switch is initiated. The network switch cause may be paging related to a voice service or a high priority service from another network, but is not limited thereto.

TABLE 2

| | |
|---|---|
| ReleaseRequest ::= | SEQUENCE { |
| preferredRRC-State | ENUMERATED {idle, inactive, connected} OPTIONAL |
| networkSwitchCause | ENUMERATED {voice, highPriority} OPTIONAL |
| } | |

In some implementations, when a multi-SIM UE is connected to Network A (or the corresponding base station) but is required to start service(s) or DL reception/UL transmissions in Network B, the UE may transmit a UE assistance information message (or a network switch request message) to Network A to inform Network A of the UE switching from Network A. In some implementations, a network switch request may be included or set in a UE assistance information message. For example, if the UE needs to switch to another network for starting service(s) or transmitting UL data to Network B, the UE may include or set a network switch request in the UE assistance information.

Network Switch Request without Network Response

In some implementations, after a UE transmits a network switch request to a network, the UE may not receive a network response corresponding to the network switch request. In some implementations, after a UE transmits a network switch request to Network A, the UE may initiate an RA procedure in Network B in response to the received paging from Network B or for the purpose of UL transmission to Network B. In some implementations, after a UE transmits a network switch request to Network A, the UE may initiate an RA procedure in Network B (in response to the received paging from Network B or for the purpose of UL transmission to Network B) without waiting for a response message corresponding to the network switch request from Network A.

In some implementations, after a UE transmits a network switch request to Network A, the UE may transition to the RRC_IDLE state (associated with Network A). In some implementations, after a UE transmits a network switch request to Network A, the UE may transition to the RRC_INACTIVE state (associated with Network A) if a suspend configuration is provided by Network A.

In some implementations, after a UE transmits a network switch request to Network A, the UE may remain in the RRC_CONNECTED state (associated with Network A) (e.g., for a short-time switching to Network B). In some implementations, after a UE transmits a network switch request to Network A, the UE may remain in the RRC_CONNECTED state (associated with Network A) if its architecture for supporting the multi-SIM operation is {single TX, dual RX} or {dual TX, dual RX}. In some implementations, after a UE transmits a network switch request to Network A, the UE may remain in the RRC_CONNECTED state (associated with Network A) if its mode is DSDA. In some implementations, after a UE transmits a network switch request to Network A, the UE may not remain in the RRC_CONNECTED state (associated with Network A) if its mode is DSDS.

In some implementations, after a UE transmits a network switch request to Network A, the UE may transition to the RRC_IDLE state (associated with Network A). In some implementations, after a UE transmits a network switch request to Network A, the UE may remain in the RRC_CONNECTED state (associated with Network A) until the UE is successfully connected to another network. In some implementations, after a UE transmits a network switch request to Network A, the UE may remain in the RRC_CONNECTED state (associated with Network A) until a timer T2 stops. In some implementations, after a UE that has a {single TX, dual RX} architecture for supporting the multi-SIM operation transmits a network switch request to Network A, the UE may remain in the RRC_CONNECTED state (associated with Network A) until a timer T2 stops. In some implementations, after a UE whose mode for supporting the multi-SIM operation is DSDS transmits a network switch request to Network A, the UE may remain in the RRC_CONNECTED state (associated with Network A) until a timer T2 stops.

In some implementations, when the timer T2 is running, Network A may still keep the UE (AS/NAS) context and the UE may not release the UE (AS/NAS) context associated with Network A. The timer T2 may be configured via dedicated signaling or broadcasting system information (from Network A to the UE). The timer T2 may be configured in a reconfiguration (e.g., otherConfig IE, network switch related IE, or ReleaseRequestConfig IE). Note that otherConfig IE may contain configuration related to miscellaneous other configurations. The ReleaseRequestConfig IE may be a configuration for the UE to report assistance information to inform the gNB of the UE's preference to leave the RRC_CONNECTED state and/or to inform the gNB of the network switch.

Implementations with respect to the time instant at which the timer T2 (if configured) is started (or restarted) by the UE may include: when the UE transmits the network switch request to Network A, when the UE initiates an RA procedure in Network B (in response to the received paging from Network B), and when the timer T2 is reconfigured.

Implementations with respect to the time instant at which the timer T2 (if configured) is stopped by the UE may include: when the UE successfully switches to Network B, when the RA procedure initiated in Network B is successfully completed (e.g., contention resolution is successful when receiving an associated MSG4 in a 4-step RA procedure in response to a sent preamble or when receiving an associated MSGB in a 2-step RA procedure in response to a sent preamble), when the UE transmits MSG5 to Network B, when an RRC connection to Network B is established, and when the timer T2 is reconfigured or released.

In some implementations, if the timer T2 (associated with Network A) expires, the UE may transmit a Network Switch Failure information to Network A. In some implementations, if the timer T2 (associated with Network A) expires, the UE may transmit an RRC Resume Request message (or initiate an RRC resume procedure) to Network A to resume the connection. In the RRC Resume Request message, the UE may indicate a resume cause as "network switch failure". The network that receives the RRC Resume Request message with the resume cause as "network switch failure" may consider that previous RRC reconfiguration(s) are still stored by the UE. Delta reconfiguration may be implemented or provided by the network accordingly.

In some implementations, if the timer T2 (associated with Network A) expires, the UE may transmit an RRC Setup Request message (or initiate an RRC Setup procedure) to Network A to establish the connection. In the RRC Setup Request message, the UE may indicate an establishment cause as "network switch failure". The network that receives the RRC Setup Request message with the establishment cause as "network switch failure" may consider that previous RRC reconfiguration(s) are still stored by the UE. Delta reconfiguration may be implemented or provided by the network accordingly.

Network Switch Request with Network Response

In some implementations, after a UE transmits a network switch request to a network, the UE may need to receive a network response corresponding to the network switch request. In some implementations, after a UE transmits a network switch request to a network, the UE may need to receive a network response corresponding to the network switch request within a time period. If no network response corresponding to the network switch request is received within the time period, the UE may act according to the previously disclosed implementations related to "network switch request without network response". In some implementations, after a UE transmits a network switch request to a network, the UE may receive a network response before initiating an RA procedure to another network. The network response may (explicitly or implicitly) indicate that the network accepts the network switch request. In some implementations, after a UE transmits a network switch request to a network, the UE may receive a network response including a redirection IE (e.g., redirectedCarrierInfo IE). After the UE receives the network response including the redirection IE, the UE may initiate an RA procedure in another network (which may be indicated by the redirection IE). In one implementation, the UE may initiate an RA procedure in the second network (e.g., Network B) upon determining that the network response indicates that the first network (e.g., Network A) accepts the network switch request.

In some implementations, after a UE transmits a network switch request to a network, the UE may receive a network response (e.g., an indicator or an RRC message) to remain in the RRC_CONNECTED state (e.g., for receiving the remaining DL transmission). In some implementations, after a UE transmits a network switch request to a network, the UE may receive a network response to transition to the RRC_INACTIVE state. For example, the network may transmit an RRC Release message with a suspend configuration in response to the network switch request (e.g., the preferred RRC state is set to RRC_INACTIVE). The UE may transition to the RRC_INACTIVE state immediately after receiving the RRC Release message with the suspend configuration. In one implementation, a timer T2 may be provided in the RRC Release message or in the suspend configuration. In some implementations, after the UE receives the RRC Release message with the suspend configuration corresponding to the network switch request, the UE may remain in the RRC_CONNECTED state (associated with Network A) until the timer T2 stops. For example, the UE may remain in the RRC_CONNECTED state after receiving the network response. When the timer T2 stops, the UE may transition to the RRC_INACTIVE state.

In some implementations, after a UE that has a {single TX, dual RX} architecture for supporting the multi-SIM operation receives an RRC Release message with a suspend configuration that responds to a network switch request, the UE may remain in the RRC_CONNECTED state (associated with Network A) until a timer T2 stops. In some implementations, after a UE whose mode for supporting the multi-SIM operation is DSDS receives an RRC Release message with a suspend configuration that responds to a network switch request, the UE may remain in the RRC_CONNECTED state (associated with Network A) until a timer T2 stops. When the timer T2 stops, the UE may transition to the RRC_INACTIVE state.

In some implementations, after a UE transmits a network switch request to a network, the UE may receive a network response to transition to the RRC_IDLE state. For example, the network may transmit an RRC Release message without a suspend configuration in response to the network switch request (e.g., the preferred RRC state is set to RRC_IDLE). The UE may transition to the RRC_IDLE state immediately after receiving the RRC Release message without the suspend configuration. A timer T2 may be provided in the RRC Release message. In some implementations, after a UE receives the RRC Release message without the suspend configuration that responds to the network switch request, the UE may remain in the RRC_CONNECTED state (associated with Network A) until the timer T2 stops. For example, the UE may remain in the RRC_CONNECTED state after receiving the network response. When the timer T2 stops, the UE may transition to the RRC_IDLE state.

In some implementations, after a UE that has a {single TX, dual RX} architecture for supporting the multi-SIM operation receives an RRC Release message without a suspend configuration that responds to a network switch request, the UE may remain in the RRC_CONNECTED state (associated with Network A) until a timer T2 stops. In some implementations, after a UE whose mode for supporting the multi-SIM operation is DSDS receives an RRC Release message without a suspend configuration that responds to a network switch request, the UE may remain in the RRC_CONNECTED state (associated with Network A) until a timer T2 stops. When the timer T2 stops, the UE may transition to the RRC_IDLE state.

In some implementations, after a UE transmits a network switch request to a network, the UE may receive a network response that indicates the network rejects the network switch request. In some implementations, if a UE receives a switch rejection (e.g., an indicator in an RRC Release message, an indicator in an RRC Release message with a suspend configuration, or an RRC message associated with the switch rejection) that responds to a network switch request, the UE may not be allowed to transmit another network switch request until a prohibit timer T3 expires. The prohibit timer T3 may be provided in the network response that indicates rejection (also referred to as a switch rejection message), preconfigured (via dedicated signaling or broadcasting system information), or predefined. In some implementations, if a UE receives a switch rejection message that responds to a network switch request, the UE may not be required to monitor paging from another network for a period. The period may be provided in the switch rejection message, preconfigured or predefined.

Consideration of Different Architectures

In some implementations, for a UE with a {single TX, dual RX} architecture for the multi-SIM operation, when the UE connected to Network A switches to Network B, the UE may keep receiving a DL command from Network A and/or remain in the RRC_CONNECTED state (associated with Network A). In one implementation, the UE may receive a DL command from Network A after receiving the network response. In one implementation, the UE may receive a DL command from Network A after switching to Network B. In one implementation, the UE may remain in the RRC_CO- NNECTED state after receiving the network response. In one implementation, the UE may remain in the RRC_CONNECTED state (associated with Network A) after switching to Network B. For example, the UE may receive an RRC Release message with a suspend configuration to transition to the RRC_INACTIVE state (associated with Network A). For example, the UE may receive an RRC Release message without a suspend configuration to transition to the RRC_IDLE state (associated with Network A). For example, the UE may receive a Timing Advance (TA) MAC CE from Network A. The UE may store and/or apply the TA in the TA MAC CE for Network A. For example, the UE may apply the TA in the TA MAC CE once the UE switches to Network A for UL transmission or once the UE needs to perform UL transmission in Network A.

In some implementations, for a UE with a {single TX, single RX} architecture for the multi-SIM operation, when the UE connected to Network A switches to Network B, the UE may keep receiving a DL command from Network A and/or remain in the RRC_CONNECTED state (associated with Network A) based on a provided period for DL transmission from Network A. For example, the single RX may be configured to receive DL transmission from Network A and DL transmission from Network B in a Time Division Multiplexing (TDM) manner. The UE may receive an RRC Release message with a suspend configuration to transition to the RRC_INACTIVE state (associated with Network A). The UE may receive an RRC Release message without a suspend configuration to transition to the RRC_IDLE state (associated with Network A). The UE may receive a TA MAC CE from Network A. In some implementations, if the UE with a {single TX, single RX} architecture for the multi-SIM operation adopts a TDM manner for receiving DL data from Network A (which the UE is connected to before the network switch), the UE may report the TDM manner to Network B (which the UE is connected to after the network switch).

In some implementations, for a UE with DSDA mode for the multi-SIM operation, when the UE connected to Network A switches to Network B, the UE may keep receiving a DL command from Network A and/or may remain in the RRC_CONNECTED state (associated with Network A). In one implementation, the UE may receive a DL command from Network A after receiving the network response. In one implementation, the UE may receive a DL command from Network A after switching to Network B. In one implementation, the UE may remain in the RRC_CONNECTED state after receiving the network response. For example, the UE may receive an RRC Release message with a suspend configuration to transition to the RRC_INACTIVE state (associated with Network A). For example, the UE may receive an RRC Release message without a suspend configuration to transition to the RRC_IDLE state (associated with Network A). For example, the UE may receive a TA MAC CE from Network A. The UE may store and/or apply the TA in TA MAC CE for Network A. For example, the UE may apply the TA in the TA MAC CE once the UE switches to Network A for UL transmission or once the UE needs to perform UL transmission in Network A.

In some implementations, for a UE with DSDA mode for the multi-SIM operation, when the UE connected to Network A switches to Network B, the UE may keep receiving a DL command from Network A and may remain in the RRC_CONNECTED state (associated with Network A) based on the provided period for DL transmission from the Network A. For example, the single RX may be configured to receive DL transmission from Network A and DL transmission from Network B in a TDM manner. The UE may receive an RRC Release message with a suspend configuration to transition to the RRC_INACTIVE state (associated with Network A). The UE may receive an RRC Release message without a suspend configuration to transition to the RRC_IDLE state (associated with Network A). The UE may receive a TA MAC CE from Network A. In some implementations, if the UE with the DSDA mode for the multi-SIM operation adopts a TDM manner for receiving DL data from Network A (which the UE is connected to before the network switch), the UE may report the TDM manner to Network B (which the UE is connected to after the network switch).

FIG. 1 is a flowchart illustrating a method 100 performed by a UE for the multi-SIM operation according to an example implementation of the present disclosure. In action 102, the UE transmits, to a first network associated with a first USIM of the UE, a first indication indicating that a status of a multi-SIM operation is active. Based on the received first indication, the first network may know that the UE supports the multi-SIM operation and the UE may leave the first network since the multi-SIM operation is currently active. The first indication may be included in an RRC message, such as a UE capability information message.

In action 104, the UE receives, from the first network, a second indication indicating that the UE is allowed to transmit a network switch request message. The second indication may be an explicit indication, such as an indicator included in a DL RRC message. The second indication may also be an implicit indication, such as broadcasting system information. For example, the first network may broadcast that the first network supports the multi-SIM operation. The UE may know that the UE is allowed to transmit the network switch request message upon receiving the broadcast information. In one implementation, the first network may transmit a configuration for network switch requests to the UE. The UE may know that the UE is allowed to transmit the network switch request message upon receiving the configuration for network switch requests.

Because of the first indication in action 102, the network can differentiate which UE is operating in the multi-SIM operation and can provide proper configuration accordingly, such as in action 104. Otherwise, the network may provide an unnecessary multi-SIM related configuration to a UE that is not operating in the multi-SIM operation or does not support the multi-SIM operation, which may result in a resource waste and extra power consumption.

In action 106, the UE transmits, to the first network, the network switch request message that indicates switching from the first network to a second network associated with a second USIM of the UE. In one implementation, the UE transmits the network switch request message upon receiving a paging message from the second network. The paging message may be related to a voice service or a high priority service. Based on the received paging message, the UE is aware that there may be an important service about to take place in the second network, such as an incoming voice call. Therefore, the UE transmits the network switch request message to inform the first network of its leaving/switching from the first network to the second network.

In one implementation, the network switch request message may be a UE assistance information message. In one implementation, the network switch request message may be an RRC release request message or a new RRC message. By transmitting the RRC release request message, the UE indicates to the first network that the UE may be about to release the current RRC connection and enter either the RRC_IDLE state or the RRC_INACTIVE state.

In one implementation, the network switch request message may indicate a preferred RRC state of the UE, which may include RRC_CONNECTED, RRC_IDLE, and RRC_INACTIVE. In one implementation, the network switch request message may indicate a network switch cause, which may include a voice-related service, a high priority service, and other causes. In one implementation, the network switch request message may indicate a purpose of the network switch, such as the multi-SIM operation.

If the UE arbitrarily releases the RRC connection to the first network, there may be unnecessary resource waste due to unpredictable UE behavior. Transmission of the network switch request message in action 106 is beneficial since it makes the first network aware of the UE's switching and able to take proper actions accordingly.

In action 108, the UE receives, from the first network, a response message in response to the network switch request message, the response message indicating whether the first network accepts or rejects the network switch request message. If the first network accepts the network switch request message, the UE may be free to switch to the second network. If the first network rejects the network switch request message, the UE may need to remain connected with the first network and may also be barred from transmitting another network switch request message in a short period. In one implementation, the first network may not reject a network switch request message that indicates the preferred RRC state of the UE.

It is beneficial for the UE to receive the response message from the first network (and a suspend configuration) in action 108, especially when the UE prefers to transition to the RRC_INACTIVE state to quickly resume the RRC connection to the first network later.

Actions illustrated in FIG. 1 should not be construed as necessarily order dependent. The order in which the process is described is not intended to be construed as a limitation. For example, information exchanged between the UE and the first network may not follow the exact order illustrated in FIG. 1. Moreover, some of the actions in FIG. 1 may be omitted in some implementations. For example, the first network may not transmit a response message in response to the network switch request message in some implementations, and thus action 108 may be optionally omitted.

Figure 2:
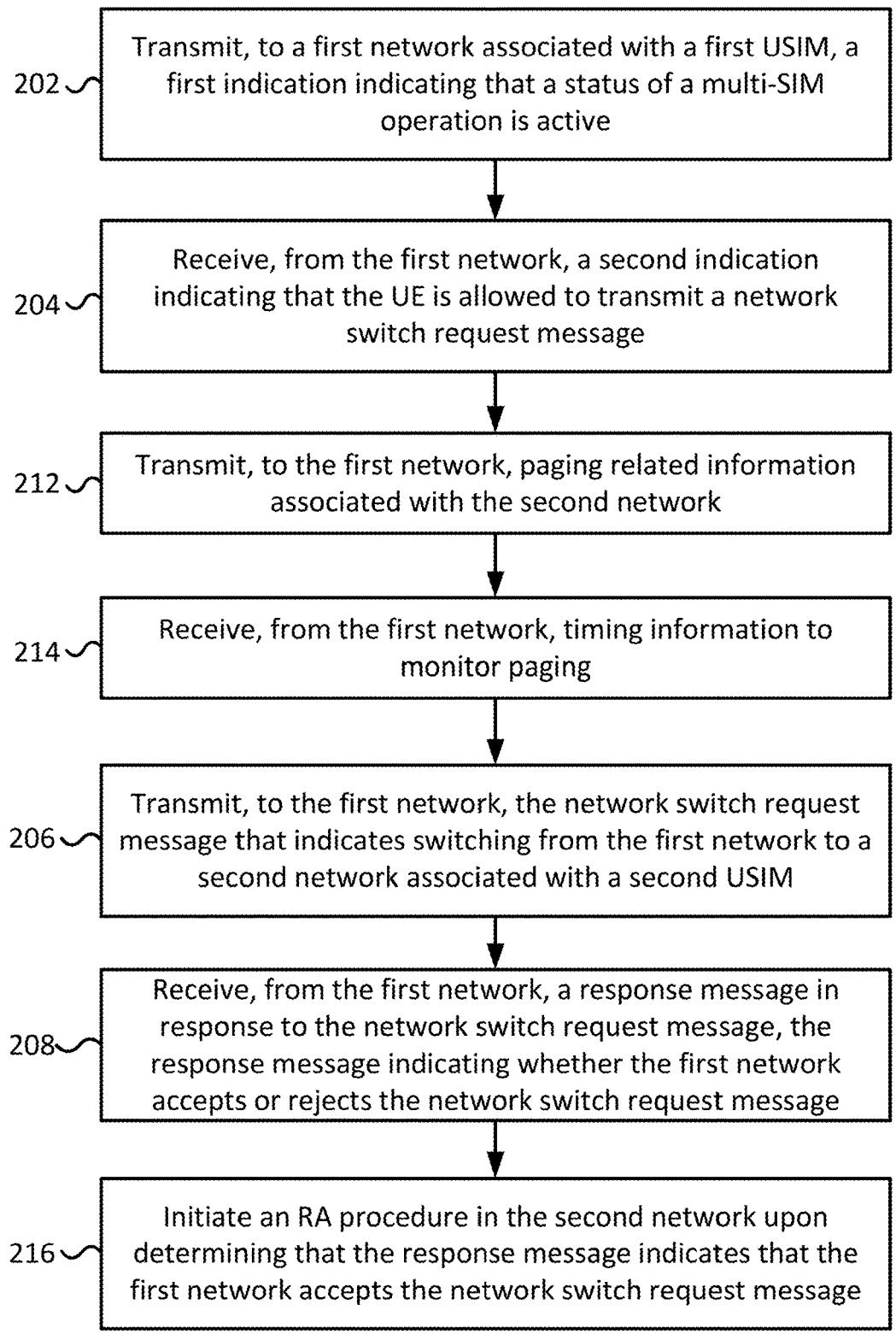
FIG. 2 is a flowchart illustrating a method performed by a UE for the multi-SIM operation according to another example implementation of the present disclosure.

FIG. 2 is a flowchart illustrating a method performed by a UE for the multi-SIM operation according to another example implementation of the present disclosure. Actions 202, 204, 206, and 208 correspond to actions 102, 104, 106, and 108 illustrated in FIG. 1. In action 212, the UE transmits, to the first network, paging related information associated with the second network. The paging related information may include paging configuration(s), related paging parameters, or other related information (e.g., a required measurement gap or a required scheduling gap) associated with the second network. Therefore, the first network may have information about the resource in which the UE monitors paging from the second network.

In action 214, the UE receives, from the first network, timing information to monitor paging (or for other DL reception/UL transmission). In one implementation, the UE may receive, from the first network, information indicating a period for the UE to monitor paging from the second network (e.g., a measurement gap). In one implementation, the UE may receive, from the first network, information indicating at least one of an adjusted paging occasion and a timing offset for the UE to monitor paging from the first network. In other words, the first network may transmit updated paging information to the UE in action 214 by considering the paging information associated with the second network. The updated paging information may replace paging occasion(s) previously calculated by the UE based on the UE ID or previously configured by the first network.

The UE may transmit the network switch request message in action 206 upon receiving a paging message from the second network. The first network may transmit a response message in 208 in response to the network switch request message. In action 216, the UE initiates an RA procedure in the second network upon determining that the response message indicates that the first network accepts the network switch request message. The UE may successfully switch to the second network when the RA procedure is successfully completed. The RA procedure in action 216 may be a 4-step RA procedure or a 2-step RA procedure. In one implementation, if the RA procedure in the second network fails, the UE may attempt to resume connection with the first network.

In one implementation, the UE remains in an RRC_CONNECTED state in the first network within a configured period after receiving the response message. In one implementation, the UE remains in an RRC_CONNECTED state in the first network within a configured period after switching to the second network. The UE may not release the UE (AS/NAS) context associated with first network. In one implementation, the UE keeps receiving a DL command from the first network after receiving the response message. In one implementation, the UE keeps receiving a DL command from the first network after switching to the second network. The DL command may include a TA MAC CE. Therefore, the UE may still be aware of UL transmission timing in the first network. Because the UE keeps a receiving DL command from the first network, the UE can immediately resume connection to the first network and operate normally. There is even no need for an RA procedure for the UE to reestablish connection with the first network.

Actions illustrated in FIG. 2 should not be construed as necessarily order dependent. The order in which the process is described is not intended to be construed as a limitation. For example, information exchanged between the UE and the first network may not follow the exact order illustrated in FIG. 2. Moreover, some of the actions in FIG. 2 may be omitted in some implementations. For example, the first network may not transmit a response message in response to the network switch request message in some implementations, and thus action 208 may be optionally omitted. Action 212 and/or action 214 may also be optionally omitted in some implementations.

Figure 3:
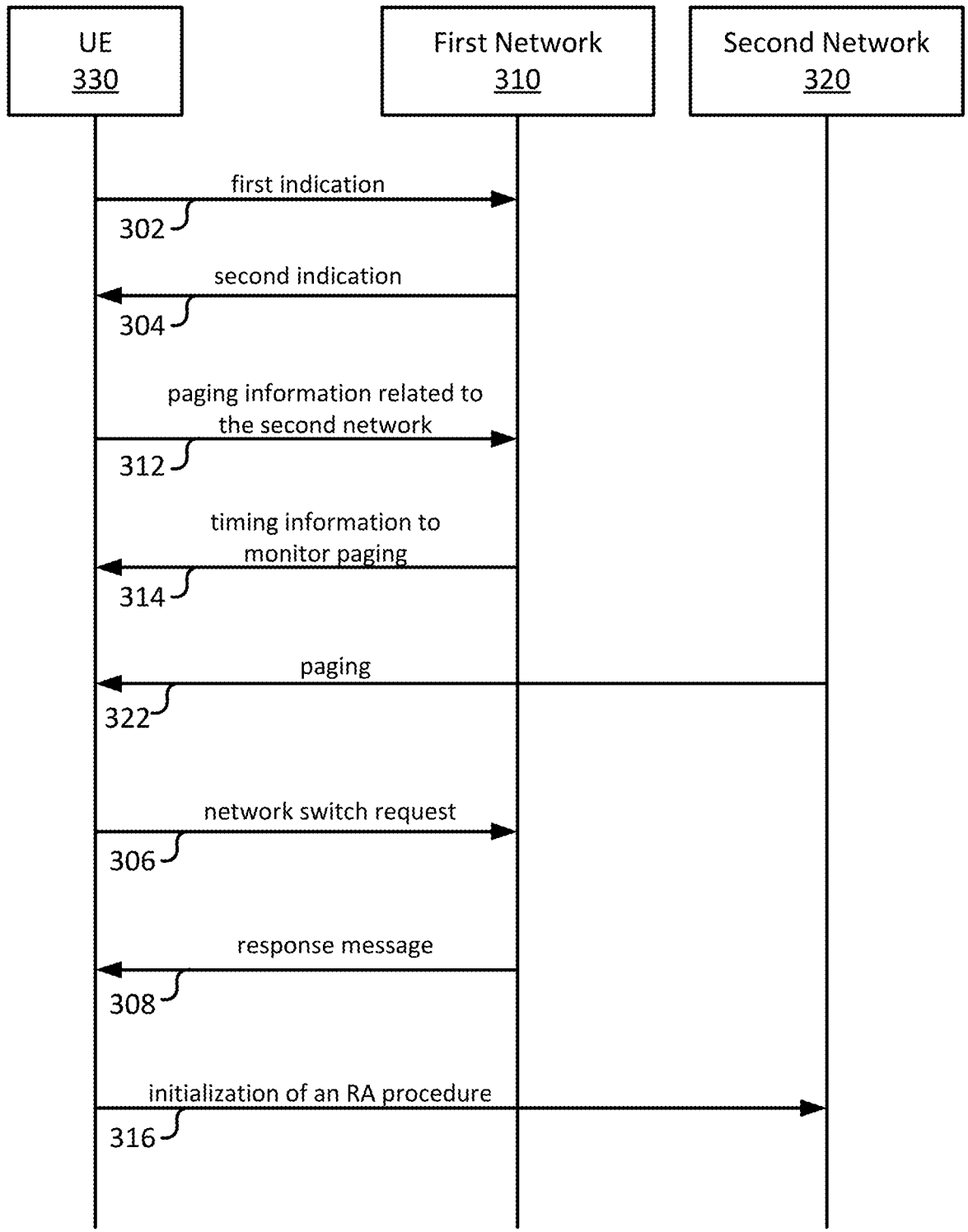
FIG. 3 is a communication diagram of a network switch procedure for the multi-SIM operation according to an example implementation of the present disclosure.

FIG. 3 is a communication diagram of a network switch procedure 300 for the multi-SIM operation according to an example implementation of the present disclosure. The first network 310 is associated with a first USIM, and the second network 320 is associated with a second USIM. The UE 330 supports the multi-SIM operation. Actions 302, 304, 306, 308, 312, 314, and 316 correspond to actions 202, 204, 206, 208, 212, 214, and 216 illustrated in FIG. 2. In action 302, the UE 330 transmits, to the first network 310, a first indication indicating that a status of the multi-SIM operation is active. In action 304, the UE 330 receives, from the first network 310, a second indication indicating that the UE 330 is allowed to transmit a network switch request message. In action 312, the UE 330 transmits, to the first network 310, paging related information associated with the second network 320. In action 314, the UE 330 receives, from the first network 310, timing information (e.g., a measurement gap or gap pattern(s)) to monitor paging (or for other DL reception/UL transmission). In action 322, the UE 330 receives a paging message from the second network 320. The paging message triggers the network switch procedure. In action 306, the UE 330 transmits, to the first network 310, the network switch request message that indicates switching from the first network 310 to the second network 320. In action 308, the UE 330 receives, from the first network 310, a response message indicating whether the first network 310 accepts or rejects the network switch request message. Action 308 may be optionally omitted in some implementations (referring to implementations of "network switch request without network response"). In action 316, the UE 330 initiates an RA procedure in the second network 320 upon determining that the response message indicates that the first network 310 accepts the network switch request message.

Figure 4:
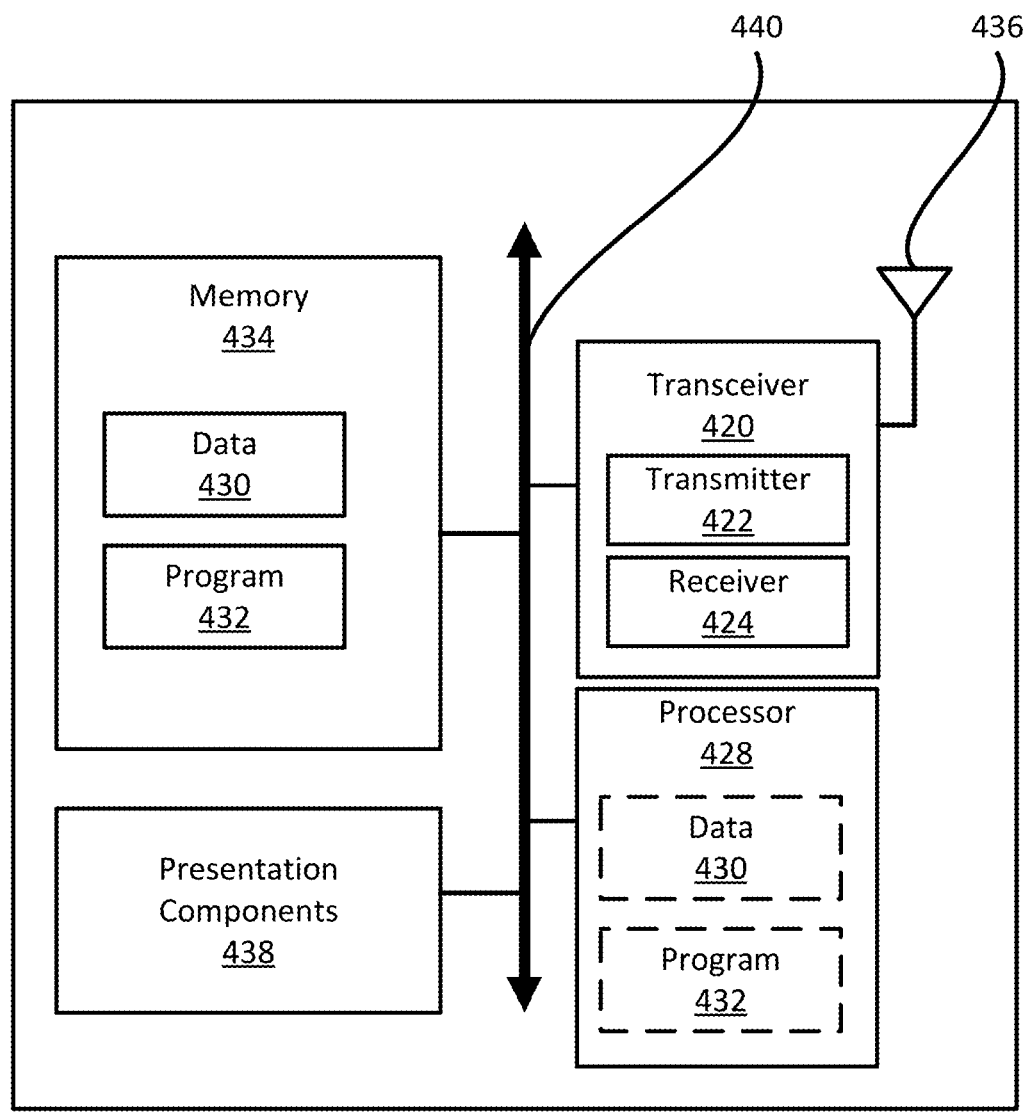
FIG. 4 is a block diagram illustrating a node for wireless communication according to an example implementation of the present disclosure.

FIG. 4 is a block diagram illustrating a node 400 for wireless communication in accordance with various aspects of the present disclosure. As illustrated in FIG. 4, a node 400 may include a transceiver 420, a processor 428, a memory 434, one or more presentation components 438, and at least one antenna 436. The node 400 may also include a radio frequency (RF) spectrum band module, a BS communications module, a network communications module, and a system communications management module, Input/Output (I/O) ports, I/O components, and a power supply (not illustrated in FIG. 4).

Each of the components may directly or indirectly communicate with each other over one or more buses 440. The node 400 may be a UE or a BS that performs various functions disclosed with reference to FIGS. 1 through 3.

The transceiver 420 has a transmitter 422 (e.g., transmitting/transmission circuitry) and a receiver 424 (e.g., receiving/reception circuitry) and may be configured to transmit and/or receive time and/or frequency resource partitioning information. The transceiver 420 may be configured to transmit in different types of subframes and slots including but not limited to usable, non-usable and flexibly usable subframes and slot formats. The transceiver 420 may be configured to receive data and control channels.

The node 400 may include a variety of computer-readable media. Computer-readable media may be any available media that may be accessed by the node 400 and include volatile (and/or non-volatile) media and removable (and/or non-removable) media.

The computer-readable media may include computer-storage media and communication media. Computer-storage media may include both volatile (and/or non-volatile media), and removable (and/or non-removable) media implemented in any method or technology for storage of information such as computer-readable instructions, data structures, program modules or data.

Computer-storage media may include RAM, ROM, EPROM, EEPROM, flash memory (or other memory technology), CD-ROM, Digital Versatile Disks (DVD) (or other optical disk storage), magnetic cassettes, magnetic tape, magnetic disk storage (or other magnetic storage devices), etc. Computer-storage media may not include a propagated data signal. Communication media may typically embody computer-readable instructions, data structures, program modules or other data in a modulated data signal such as a carrier wave or other transport mechanisms and include any information delivery media.

The term "modulated data signal" may mean a signal that has one or more of its characteristics set or changed in such a manner as to encode information in the signal. Communication media may include wired media such as a wired network or direct-wired connection, and wireless media such as acoustic, RF, infrared and other wireless media. Combinations of any of the previously listed components should also be included within the scope of computer-readable media.

The memory 434 may include computer-storage media in the form of volatile and/or non-volatile memory. The memory 434 may be removable, non-removable, or a combination thereof. Example memory may include solid-state memory, hard drives, optical-disc drives, etc. As illustrated in FIG. 4, the memory 434 may store a computer-readable and/or computer-executable program 432 (e.g., software codes) that are configured to, when executed, cause the processor 428 to perform various functions disclosed herein, for example, with reference to FIGS. 1 through 3. Alternatively, the program 432 may not be directly executable by the processor 428 but may be configured to cause the node 400 (e.g., when compiled and executed) to perform various functions disclosed herein.

The processor 428 (e.g., having processing circuitry) may include an intelligent hardware device, e.g., a Central Processing Unit (CPU), a microcontroller, an ASIC, etc. The processor 428 may include memory. The processor 428 may process the data 430 and the program 432 received from the memory 434, and information transmitted and received via the transceiver 420, the base band communications module, and/or the network communications module. The processor 428 may also process information to send to the transceiver 420 for transmission via the antenna 436 to the network communications module for transmission to a CN.

One or more presentation components 438 may present data indications to a person or another device. Examples of presentation components 438 may include a display device, a speaker, a printing component, a vibrating component, etc.

In view of the present disclosure, it is obvious that various techniques may be used for implementing the disclosed concepts without departing from the scope of those concepts. Moreover, while the concepts have been disclosed with specific reference to certain implementations, a person of ordinary skill in the art may recognize that changes may be made in form and detail without departing from the scope of those concepts. As such, the disclosed implementations are to be considered in all respects as illustrative and not restrictive. It should also be understood that the present disclosure is not limited to the particular implementations disclosed and many rearrangements, modifications, and substitutions are possible without departing from the scope of the present disclosure.

What is claimed is:

1. A method for a multi-subscriber identity module (multi-SIM) operation performed by a user equipment (UE), the method comprising:

connecting to a first network associated with a first Universal Subscriber Identity Module USIM) of the UE;

receiving, from the first network, a first configuration indicating that the UE is allowed to transmit an assistance information message for switching to a second network associated with a second USIM of the UE, the first configuration further including a configuration of a timer;

transmitting, to the first network, the assistance information message, the assistance information message comprising information of a preferred Radio Resource Control (RRC) state associated with the first network to indicate that the UE prefers to switch from an RRC_CONNECTED state associated with the first network to the preferred RRC state; and starting the timer upon transmitting the assistance information message.

2. The method of claim 1, wherein the first configuration, as received, is set to a setup configuration which indicates that the UE is allowed to transmit the assistance information message.

3. The method of claim 1, wherein transmitting the assistance information message comprises transmitting the assistance information message upon determining that the timer is not running.

4. The method of claim 1, further comprising:
stopping the timer upon determining that the first configuration is set to a release configuration.

5. The method of claim 1, further comprising:
stopping the timer upon transitioning to an RRC_IDLE state associated with the first network.

6. The method of claim 1, wherein the preferred RRC state is an RRC_INACTIVE state.

7. The method of claim 1, wherein the preferred RRC state is an RRC_IDLE state.

8. The method of claim 1, wherein transmitting the assistance information message to the first network comprises transmitting the assistance information message after determining that the UE is capable of providing assistance information related to the multi-SIM operation.

9. The method of claim 1, further comprising:
transmitting, to the first network, capability information indicating that the UE supports the multi-SIM operation.

10. The method of claim 1, further comprising:
receiving, from the first network, a second configuration indicating a measurement gap used for the second network.

11. A user equipment (UE) for a multi-subscriber identity module (multi-SIM) operation, comprising:
one or more processors; and
at least one memory coupled to the one or more processors, wherein the at least one memory stores a computer-executable program that, when executed by the one or more processors, causes the UE to:
connect to a first network associated with a first Universal Subscriber Identity Module (USIM) of the UE;
receive, from the first network, a first configuration indicating that the UE is allowed to transmit an assistance information message for switching to a second network associated with a second USIM of the UE, the first configuration further including a configuration of a timer;
transmit, to the first network, the assistance information message, the assistance information message comprising information of a preferred Radio Resource Control (RRC) state associated with the first network to indicate that the UE prefers to switch from an RRC_CONNECTED state associated with the first network to the preferred RRC state; and
start the timer upon transmitting the assistance information message.

12. The UE of claim 11, wherein the first configuration, as received, is set to a setup configuration which indicates that the UE is allowed to transmit the assistance information message.

13. The UE of claim 11, wherein transmitting the assistance information message comprises transmitting the assistance information message upon determining that the timer is not running.

14. The UE of claim 11, wherein the computer-executable program, when executed by the one or more processors, further causes the UE to stop the timer upon determining that the first configuration is set to release.

15. The UE of claim 11, wherein the computer-executable program, when executed by the one or more processors, further causes the UE to stop the timer upon transitioning to an RRC_IDLE state associated with the first network.

16. The UE of claim 11, wherein the preferred RRC state is an RRC_INACTIVE state.

17. The UE of claim 11, wherein the preferred RRC state is an RRC_IDLE state.

18. The UE of claim 11, wherein transmitting the assistance information message to the first network comprises transmitting the assistance information message after determining that the UE is capable of providing assistance information related to the multi-SIM operation.

19. The UE of claim 11, wherein the computer-executable program, when executed by the one or more processors, further causes the UE to transmit, to the first network, capability information indicating that the UE supports the multi-SIM operation.

20. The UE of claim 11, wherein the computer-executable program, when executed by the one or more processors, further causes the UE to receive, from the first network, a second configuration indicating a measurement gap used for the second network.

* * * * *